United States Patent
Gehrmann et al.

(10) Patent No.: US 8,295,808 B2
(45) Date of Patent: Oct. 23, 2012

(54) SECURE REMOTE SUBSCRIPTION MODULE ACCESS

(75) Inventors: Christian Gehrmann, Lund (SE); Bernard Smeets, Dalby (SE)

(73) Assignee: Telefonaktiebolaget L M Ericsson (publ.), Stockholm (SE)

( * ) Notice: Subject to any disclaimer, the term of this patent is extended or adjusted under 35 U.S.C. 154(b) by 0 days.

(21) Appl. No.: 10/476,522

(22) PCT Filed: Mar. 22, 2002

(86) PCT No.: PCT/EP02/03716
§ 371 (c)(1),
(2), (4) Date: May 3, 2004

(87) PCT Pub. No.: WO02/091704
PCT Pub. Date: Nov. 14, 2002

(65) Prior Publication Data
US 2004/0176071 A1    Sep. 9, 2004

Related U.S. Application Data

(60) Provisional application No. 60/303,083, filed on Jul. 6, 2001.

(30) Foreign Application Priority Data

May 8, 2001 (DK) ................... 2001 00721
Dec. 7, 2001 (EP) ...................... 01610124

(51) Int. Cl.
*H04M 1/66* (2006.01)
(52) U.S. Cl. ......... 455/411; 455/410; 455/558; 713/168
(58) Field of Classification Search .............. 455/410, 455/411, 517, 425, 418, 419, 420; 713/182, 713/171, 168
See application file for complete search history.

(56) References Cited

U.S. PATENT DOCUMENTS 5,661,806 A * 8/1997 Nevoux et al. ............... 380/247
(Continued)

FOREIGN PATENT DOCUMENTS

EP       1075155 A     7/2001
(Continued)

OTHER PUBLICATIONS

Patiyoot, D. et al.: "Techniques for Authentication Protocols and Key Distribution on Wireless ATM Networks", Operating Systems Review (SIGOPS), ACM Headquarters, New York, USA, vol. 32, No. 4, Oct. 1998, pp. 25-32, XP000849892.

*Primary Examiner* — Kwasi Karikari
(74) *Attorney, Agent, or Firm* — Potomac Patent Group PLLC (57) ABSTRACT

Disclosed is a method of granting a client communications terminal access to a subscription module of a server communications terminal, the method comprising the steps of establishing a communications link between the client communications terminal and the server communications terminal; communicating data related to the subscription module between the server communications terminal and the client communications terminal via the communications link; authenticating the client communications terminal by the subscription module using a key-based authentication procedure; and initiating the step of communicating data related to the subscription module conditioned on a result of the step of authenticating the client communications device. The present invention further relates to an arrangement for granting access to a subscription module in a communications system. The present invention also relates to a server communications terminal comprising a subscription module, a client communications terminal and a subscription module.

36 Claims, 2 Drawing Sheets

U.S. PATENT DOCUMENTS

| | | | |
|---|---|---|---|
| 5,907,616 A * | 5/1999 | Brogger et al. | 713/172 |
| 5,909,491 A * | 6/1999 | Luo | 380/270 |
| 5,915,225 A * | 6/1999 | Mills | 455/558 |
| 6,052,604 A * | 4/2000 | Bishop et al. | 455/558 |
| 6,075,860 A * | 6/2000 | Ketcham | 713/159 |
| 6,134,431 A * | 10/2000 | Matsumoto et al. | 455/411 |
| 6,141,564 A * | 10/2000 | Bruner et al. | 455/558 |
| 6,466,804 B1 * | 10/2002 | Pecen et al. | 455/558 |
| 6,556,820 B1 * | 4/2003 | Le et al. | 455/411 |
| 6,591,095 B1 * | 7/2003 | Palaniswamy et al. | 455/411 |
| 6,591,116 B1 * | 7/2003 | Laurila et al. | 455/558 |
| 6,615,057 B1 * | 9/2003 | Pettersson | 455/558 |
| 6,745,326 B1 * | 6/2004 | Wary | 713/168 |
| 6,804,517 B1 * | 10/2004 | Laurila | 455/435.1 |
| 6,857,072 B1 * | 2/2005 | Schuster et al. | 713/160 |
| 6,859,650 B1 * | 2/2005 | Ritter | 455/406 |
| 6,928,299 B1 * | 8/2005 | Rinne et al. | 455/555 |
| 6,976,171 B1 * | 12/2005 | Ritter et al. | 713/193 |
| 6,980,660 B1 * | 12/2005 | Hind et al. | 380/282 |
| 7,050,993 B1 * | 5/2006 | Piikivi et al. | 705/26 |
| 2002/0147926 A1 * | 10/2002 | Pecen et al. | 713/201 |
| 2002/0162021 A1 * | 10/2002 | Audebert et al. | 713/201 |

FOREIGN PATENT DOCUMENTS

WO     WO99/59360     11/1999

* cited by examiner

SECURE REMOTE SUBSCRIPTION MODULE ACCESS

CROSS REFERENCE TO RELATED APPLICATIONS

This application claims the benefit of U.S. Provisional Application No. 60/303,083, filed Jul. 6, 2001.

This invention relates to a method of granting a client communications terminal access to a subscription module of a server communications terminal. The present invention further relates to an arrangement for granting access to a subscription module in a communications system. The present invention also relates to a server communications terminal comprising a subscription module, a client communications terminal and a subscription module.

In many wireless communications systems, communications terminals are equipped with a subscription module. When a subscriber requests a communication service it is determined, via said subscription module, whether the subscriber is qualified to receive communication services which the system provides. For this purpose, a subscriber identity is assigned to a terminal in a wireless communications system which uses a subscriber identity media. In order to get access to the communications services, the communications terminal needs to have access to security sensitive information which is unique to the subscription and which is stored in the subscription module.

The term communications terminal includes all portable radio communications equipment to which a subscriber identity is assigned, such as a mobile telephone, a communicator, an electronic organiser, a personal digital assistant (PDA), or the like. The wireless communications system may, for instance, be any cellular mobile phone system such as GSM (Global System for Mobile Communications) or any satellite telecommunication system.

In the context of GSM, subscription is based on a SIM (subscriber identity module) card, i.e. the subscription module is implemented as a SIM card attached to a mobile terminal. The SIM card includes a ROM (Read Only Memory), a RAM (Read Access Memory), an EEPROM (Electrically Erasable Programmable Read Only Memory), a processor unit and an interface to the communications terminal. The memory of the SIM provides storage of the subscriber identity which is the International Mobile Subscriber Identity (IMSI) in a GSM network. Except for emergency calls, the terminal can only be operated, if a valid SIM is present. The SIM supports a security function for verification of the user of the terminal and for authentication of the user to the GSM network. The SIM further comprises information elements for GSM network operations, e.g. related to the mobile subscriber or GSM services.

In the above described context, if a user would like to use a SIM card, i.e. a single subscription, to connect to a wireless communications network from several different personal mobile terminals, he or she needs to manually remove the SIM card from one device and put it into another device. In order to avoid this inconvenient operation it is advantageous, if the wireless communication system allows more than one communications terminal to share the same subscriber identity without having to pay for more than one subscription.

The international application WO 99/59360 discloses an arrangement for communicating SIM related data in a wireless communications system between a wireless communications terminal and a subscriber identity terminal including a subscriber identity unit with a SIM card. The wireless communications terminal and the subscriber identity terminal are separated from each other, but may communicate with each other via a local wireless communications link within a radio frequency range. SIM related data is communicated over the local wireless communications link. Hence the above prior art system allows a simplified sharing of a subscription module by several communications terminals. Instead of moving the SIM card between different mobile terminals, direct wireless access to the SIM card over an air interface is realised. In the above prior art, the local wireless communications link is encrypted in order to establish a secure wireless communications link that hinders third party interception of sensitive information.

However, the above prior art system involves the problem that the client terminal may be under control of a dishonest user who may misuse the gained access to the communications access. Furthermore, if the local wireless communications link is a link to a local wireless network, such as a Bluetooth piconet, the link between the client terminal and the server terminal may comprise several wireless connections involving intermediate terminals, thereby causing the security of the communications link to be difficult to control, even though the individual communications links may be encrypted. Hence, there is a risk of unauthorised interception and use of sensitive data related to the subscription module.

The above and other problems are solved when a method of granting a client communications terminal access to a subscription module of a server communications terminal, the method comprising the steps of establishing a communications link between the client communications terminal and the server communications terminal; and communicating data related to the subscription module between the server communications terminal and the client communications terminal via the communications link is characterized in that the method further comprises the steps of authenticating the client communications terminal by the subscription module using a key-based authentication procedure; and initiating the step of communicating data related to the subscription module conditioned on a result of the step of authenticating the client communications device.

Consequently, the present invention provides a secure end-to-end authentication between the subscription module and the client communications terminal. According to the present invention, the internal communication between the subscription module and the server communications terminal is protected as well as the communication between the client and server communications terminals, thereby providing protection of the entire communications path. For example, when a user of the subscription module enters a PIN in order to activate the subscription module, this information is authenticated end-to-end, i.e. between the subscription module and the client communications terminal, thereby providing a considerably improved security against unauthorised use of the sensitive information on the subscription module.

Therefore, the present invention allows a remote device to securely use the subscription module of another device in order to get access to important information or functions needed for example to connect to a cellular network.

The communications link may be an electric link or a wireless communications link, such as an electro-magnetic, magnetic or inductive link. Examples of electro-magnetic links include, radio-frequency links, optical links, infrared links, microwave links, ultra sound links, or the like. For example, the communications link may be a radio link according to the Bluetooth standard, i.e. a Short-range wireless technology that enables different units to communicate with relatively high speed. Bluetooth as well as other short-range wireless technologies make it possible to set up fast connections between different personal computing devices like a mobile phone, a Personal Digital Assistant (PDA), etc.

The term communications terminal comprises any electronic equipment including communications means adapted to establish a communications link as described above, or part of such electronic equipment. The term electronic equipment includes computers, such as stationary and portable PCs, stationary and portable radio communications equipment, etc. The term portable radio communications equipment includes mobile radio terminals such as mobile telephones, pagers, communicators, e.g. electronic organisers, smart phones, PDAs, or the like.

The term subscription module comprises modules which may be removably inserted into a communications terminal, such as a smart card, a SIM card, a wireless identity module (WIM) card, or the like. The term subscription module further comprises modules which are physically inseparable from the server communications terminal. In one embodiment, the subscription module may comprise a security unit comprising a processing unit for performing the authentication, and storage means for storing one or more keys for use during authentication. The storage means may be an integral part of the security module, removably insertable, or the like.

The data communicated between the client and the server communications terminal may be data stored in the subscription module which may be required to register the client communications terminal in a cellular network, to establish a communications connection, e.g. a voice, fax, or data call, hereafter referred to as a "call", from the client communications terminal, to receive a call from the network directed to a telephone number associated with the subscription module, to authorise payments or other transactions, access functionality or interfaces of the server communications device, or the like. The data may further comprise subscription authorisation data, e.g. a PIN code entered by a user of the client communications terminal and sent to the server communications terminal. The data may further comprise address data, phone books, or any other sensitive data related to the subscription module. The communication of data may comprise the transmission of data from the server communications terminal to the client communications terminal and/or the transmission of data from the client communications terminal to the server communications terminal. Hence, access to the subscription module involves access to the data related to the subscription module, i.e. the transmission of data to the subscription module, the reception of data from the subscription module, or the like.

The subscription module may be able to authenticate a number of different client communications devices.

When the method further comprises the step of authenticating the subscription module by the client communications terminal using the key-based authentication procedure, additional security is achieved, as only an authorised subscription module is trusted by the client communications terminal. Hence, the user of the client communications device can be sure that the client communications device communicates with the correct and trusted subscription module. This is a particular advantage, if the user of the client communications terminal wishes to send sensitive data to the subscription module, e.g. PIN codes, account data, personal data, etc.

In a preferred embodiment of the invention, the key-based authentication procedure is a symmetric authentication procedure based on a first secret key stored in both the client communications terminal and the subscription module. Hence, the authentication is based on a common shared secret between the client communications device and the subscription module, which may be used to authenticate the client communications device and/or the subscription module. It is an advantage of the embodiment, that it provides an efficient and highly secure mechanism of authentication. The first secret key may be a long-lived key, and the subscription module may be pre-configured with that key. Alternatively or additionally, a temporary secret may be used allowing a client communications device temporary access to the subscription module. It is an advantage of the use of a symmetric key mechanism, that it provides a high level of security even with a short key, e.g. 64 or 128 bits, and with a authentication mechanism which only requires little computational resources. In particular, this is an advantage, if the communications terminals have limited storage capacity and computational resources or limited power supply.

When the step of communicating data related to the subscription module further comprises the step of encrypting the data using an encryption key derived from the first secret key, an end-to-end encryption of the communication between the subscription module and the client communications terminal is achieved, thereby providing a high level of security of the transmitted information against misuse and interception. It is an advantage of the invention that even the internal communication within the server communications device, i.e. the communication over the interface provided by the subscription module, is protected. For example, when the user of the subscription module enters a PIN in order to activate the subscription module, that PIN is sent to the subscription module in encrypted form and, thus, is protected from interception during the entire communications, even inside the server communications device. This is a particularly important advantage in the case of a modular server communications terminal where the interface of the subscription module is accessible by other modules or devices. Preferably, the key used for encrypting the communications is derived from the first secret key where the term derived includes the possibility of using the first secret key directly.

When the method further comprises the step of deriving an encryption key from the first secret key, the communicated data is further protected against unauthorised alteration. Preferably, the step of communicating data related to the subscription module further comprises the step of integrity protecting the data using a key derived from the first secret key.

In another preferred embodiment of the invention, the key-based authentication procedure is a public key-based authentication procedure wherein the subscription module has access to a public key related to the client communications terminal. Hence, the authentication of the client communications device is based upon a public key of the client communications device which the subscription module has access to. It is an advantage of this embodiment that there is no need for a shared secret between the client communications terminal and the subscription module. As the security requirements for communicating a public key are lower than for a symmetric key, the subscription module may receive a public key of the client subscription module in several different ways, thereby increasing the flexibility of the method. Furthermore, the public key of the client communications terminal does not need to be permanently stored in the subscription module, thereby saving storage space in the subscription module.

In a further preferred embodiment of the invention the method further comprises the step of authenticating the subscription module by the client communications terminal using the public key-based authentication procedure wherein the client communications terminal has access to a public key related to the subscription module. Hence, additional security is achieved, as only an authorised subscription module is trusted by the client communications terminal. This is a particular advantage, if the user of the client communications terminal wishes to send sensitive data to the subscription module.

When the step of authenticating the client communications terminal further comprises the step of exchanging between the client communications terminal and the subscription module a second secret key for use during cryptographic protection of the data related to the subscription module communicated between the server communications terminal and the client communications terminal via the communications link, an end-to-end encryption of the communication between the subscription module and the client communications terminal is achieved, thereby providing a high level of security of the transmitted information against misuse and interception even during the internal communication within the server communications device, i.e. the communication over the interface provided by the subscription module. Preferably, the step of communicating data related to the subscription module further comprises the step of encrypting the data using an encryption key derived from the second secret key.

Alternatively, the encryption may be based on a asymmetrical encryption scheme using a public key and without the need for a shared secret.

Furthermore, when the step of communicating data related to the subscription module further comprises the step of integrity protecting the data using a key derived from the second secret key, the communicated data is further protected against unauthorised alteration.

According to another preferred embodiment of the invention, the step of authenticating the client communications terminal further comprises the step of inquiring an input from a user of the server communications terminal indicative of an approval of the authentication. Consequently, as the communication of data to/from the subscription module requires an approval by the user of the server communications device comprising the subscription module, additional security against misuse or accidental use is achieved. For example, the user may press a predetermined button and/or input a PIN code in order to authorise the access to the subscription module.

When the step of initiating communicating data related to the subscription module further comprises the step of performing a user authorisation based on a PIN code stored on the subscription module, access to the data related to the subscription module may be controlled more fine-grained, as different types of data may be associated with different PIN codes, thereby providing the possibility of selectively granting access to parts of the data. Alternatively or additionally, different types of access, such as read, write, delete, or the like, may be associated with different PIN codes. Hence, according to this embodiment, a user of the client communications device is required to enter a PIN code prior to being granted access to the data.

According to a further aspect of the invention, the invention relates to an arrangement for granting access to a subscription module in a communications system, the arrangement comprising a client communications terminal and a server communications terminal including the subscription module, the client and server communications terminals each comprising respective communications means for establishing a communications link between the client communications terminal and the server communications terminal, and for communicating data related to the subscription module between the server communications terminal and the client communications terminal via the communications link; characterised in that the subscription module further comprises processing means adapted to authenticate the client communications terminal using a key-based authentication procedure, and to grant access to the subscription module conditioned on a result of the authentication procedure.

When the communications link is a wireless communications link, a fast way of establishing a communications link is provided without the need of a physical or electrical connection between the terminals.

When the server communications terminal, the communications means of the server communications terminal, and the subscription module are physically included in a single unit, a particularly high level of security is provided, as the possibility of data interception and misuse is further reduced. Advantageously, the server communications terminal, a wireless interface and the subscription module may be implemented as one physically inseparable entity.

According to a further aspect of the invention, the invention relates to a server communications terminal comprising a subscription module and communications means for establishing a communications link with a client communications terminal and for communicating data related to the subscription module with the client communications terminal via the communications link; characterised in that the subscription module comprises processing means adapted to authenticate the client communications terminal using a key-based authentication procedure, and to grant access to the subscription module conditioned on a result of the authentication procedure.

The server communications terminal may be used as a server terminal for a number of different client communications terminals using the same subscription.

According to a further aspect of the invention, the invention relates to a client communications terminal comprising communications means for establishing a communications link with a server communications terminal including a subscription module, and for communicating data related to the subscription module with the server communications terminal via the communications link; characterised in that the client communications terminal comprises processing means adapted to perform a key-based authentication procedure cooperatively with the subscription module allowing the subscription module to authenticate the client communications terminal and to grant access to the subscription module conditioned on a result of the authentication procedure.

According to a further aspect of the invention, the invention relates to a subscription module for use with a server communications terminal, the server communications terminal including communications means for establishing a communications link with a client communications terminal and for communicating data related to the subscription module with the client communications terminal via the communications link; characterised in that the subscription module comprises processing means adapted to, when the subscription module is in connection with the server communications terminal, authenticate the client communications terminal using a key-based authentication procedure, and to grant access to the subscription module conditioned on a result of the authentication procedure.

The subscription module may be brought into physical contact with, e.g. inserted in, the server communications terminal, or a communications connection may be established, e.g. by bringing the subscription module into the range of coverage of a wireless communications interface.

The term processing means comprises a programmable microprocessor, an application-specific integrated circuit, or another integrated circuit, a smart card, or the like.

The term storage means includes magnetic tape, optical disc, digital video disk (DVD), compact disc (CD or CD-ROM), mini-disc, hard disk, floppy disk, ferro-electric memory, electrically erasable programmable read only memory (EEPROM), flash memory, EPROM, read only memory (ROM), static random access memory (SRAM), dynamic random access memory (DRAM), synchronous dynamic random access memory (SDRAM), ferromagnetic memory, optical storage, charge coupled devices, smart cards, PCMCIA cards, etc.

The term communications means comprises any circuit adapted to establish the above mentioned communications link. Examples of such circuits include RF transmitters/receivers, e.g. Bluetooth transceivers, light emitters/receivers, e.g. LEDs, infrared sensors/emitters, ultrasound transducers, etc.

Furthermore, the features and steps of the above discussed method according to the invention may be incorporated in the further aspects of the invention discussed above, and the advantages discussed in connection with the above method correspond to advantages of these further aspects of the invention.

The invention will be explained more fully below in connection with a preferred embodiment and with reference to the drawing, in which.

Figure 1:
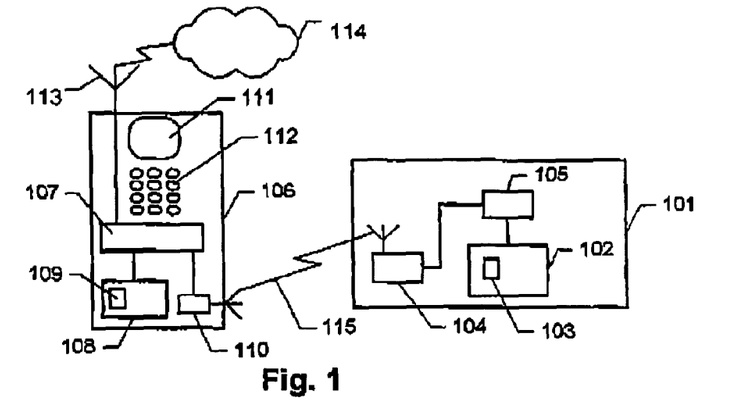
FIG. 1 shows a schematic view of a client communications terminal and a server communications terminal according to an embodiment of the invention.

FIG. 1 shows a schematic view of a client communications terminal and a server communications terminal according to an embodiment of the invention. The client communications terminal 106 includes an aerial 113 for communicating via a mobile communications network 114, e.g. a GSM network. The client communications terminal further comprises circuitry 107 for controlling the communications terminal, a storage medium 108, a display 111 and a keypad 112, or other user input/output means. For example, the client communications device may be a mobile telephone or another personal communications device, such as a communicator, a PDA, a pager, a car phone, or the like. Further examples of a client communications device include a modem, a telefax or other telecommunications equipment. The storage medium 108 may be a memory section of a SIM card comprising EPROM, ROM and/or RAM sections. Alternatively, the storage medium may be a another built-in or insertable memory, such as EEPROM, flash memory, ROM, RAM, etc.

The client communications terminal further comprises a Bluetooth transceiver 110. Via the Bluetooth transceiver, a local radio link 115 for data transmission can be established between the client communications terminal and a Bluetooth transceiver 104 of a server communications terminal 101 when the server communications device is brought into the connection range of the wireless local communication of the client communications device, or vice versa. The server communications terminal 101 comprises a processing unit 105 and a subscription module 102. In one embodiment, the subscription module is a SIM card comprising a processing unit, a memory including an EPROM section, a ROM section and a RAM section and an input/output port. Hence, the server communications device has direct access to a subscription module and is physically connection to it. The server communications device may grant the client communications terminal access to the services and files of the subscription module 102. For example, the server communications terminal may be a mobile telephone or other personal communications equipment. Alternatively, the server communications device may be a special remote access device which only serves as an access server for different client terminals. For example, the server communications terminal may be implemented as a contactless smart card, e.g. a smart card with an integrated wireless communications interface such as a short-range radio interface.

Hence, the client communications terminal 106 may access the services and files of the subscription module 102 of the server communications terminal 101, via the radio link 115, and use the accessed for the connection to the cellular network 114. In the above, two general roles have been described: A Remote Authentication Access Server (RAA Server) having direct access to the subscription module, and a Remote Authentication Access Client (RAA Client) obtaining remote access to the subscription module, thereby obtaining access to a number of possible services. Hence, in the following, the client communications terminal will also be referred to as the RAA Client and the server communications terminal will be referred to as the RAA Server. Examples of the functionality, services and data which may be accessed by the RAA Client include:

Register the RAA Client 106 in a cellular network 114 using the subscription module 102 in the RAA Server 101.

The RAA client 106 can access data and services available in the subscription module 102.

The RAA Server 101 may exercise access control on what services and data can be accessed by a RAA Client 106;

Establish a connection (i.e. a voice, fax, or data call), hereafter referred to as a "call", from the RAA Client 106 using the subscription module 102 in the RAA server 101;

Receiving a call from the network 114 at the RAA Client 106.

According to the invention, the subscription module 102 comprises a remote access authorisation functionality 103 for the protection of the subscription module against unauthorised access to the sensitive subscription information and services on the module. The remote access authorisation functionality 103 provides functionality for the authentication of different RAA Clients, such that only an authorised RAA client is allowed to get access to the subscription module 102. The authentication procedure may be based on a symmetric key mechanism, a public key mechanism, or the like. Two embodiments of such mechanisms will be described in greater detail in connection with FIGS. 5-6. Preferably, the RAA Client 106 comprises a corresponding remote server authorisation functionality 109 allowing the RAA Client 106 to authenticate different subscription modules. Only an authorised module is trusted by the RAA Client. According to the invention, the remote access authorisation functionality 103 and the remote server authorisation functionality 109 have a shared secret, or the possibility of exchanging a shared secret key, used to authenticate and/or protect the connection between the RAA Client 106 and the subscription module 102. The connection between the RAA client 106 and the subscription module 102 is encrypted end-to-end. The key used for the encryption is either fixed or, preferably, derived from the shared secret at each connection set-up. The communication between the RAA client and the subscription module may further be integrity protected end-to-end using a key derived from the shared secret. Furthermore, the subscription associated with the subscription module 102 may have one or more PIN codes associated with it. Each of these PIN codes may be associated with access restriction to the data and services on the module.

Hence, it is an advantage of the invention that it provides protection of the connection and authentication of the RAA Client which accesses the subscription module over an air interface. If Bluetooth is used, build-in Bluetooth authentication and encryption can protect the air interface as the Bluetooth baseband security mechanism (Bluetooth Special Interest Group, "Baseband Specification", Specification of the Bluetooth System, Core, Version 1.1, Dec. 1, 2000) allows fast authentication and encryption between two Bluetooth modules. However, this is only realised on the link level between two Bluetooth radio units and, hence, this is not an end-to-end solution with the subscription module at one end and the RAA Client at the other. Hence, it is an advantage of the invention that it provides authentication and encryption end-to-end between the subscription module and the terminal where the RAA client resides.

It is noted that, in one embodiment, the subscription module 102 may regard the RAA Server 101 as a trusted proxy. In this scenario, access control may still be realised by the subscription module 102 or it may be delegated to the processing unit 105 of the RAA Server.

Figure 2:
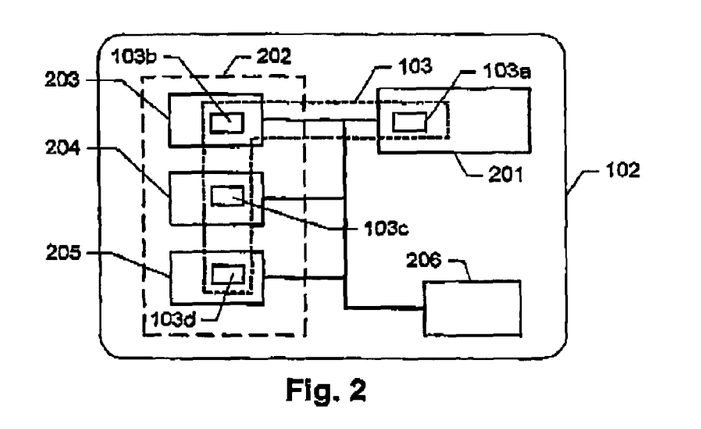
FIG. 2 shows a schematic view of a subscription module according to an embodiment of the invention.

FIG. 2 shows a schematic view of a subscription module according to an embodiment of the invention. The subscription module 102 comprises a processing unit 201 and memory 202 which may be divided into a ROM section 203, an EPROM section 204 and a RAM section 205. The subscription module further comprises an input/output interface 206 for communicating with the device it is inserted in. For example, the subscription module may be a smart card which may be removably inserted in the server communications terminal, e.g. a SIM card in the context of a GSM network. According to the invention, the subscription module is adapted to provide remote access security functionality 103 for protecting access to data stored in the memory 202 and the functionality of the processing unit 201. The processing unit 201 is adapted to provide a number of security functions 103*a*, e.g. as part of the software executed on the processing unit or implemented in hardware. The remote access security functions 103*a* have access to one or more key codes 103*b-d* of a key based authentication mechanism stored in the memory 202 of the subscription module. The key(s) may be stored in the ROM section 203, the EPROM section 204 and/or the RAM section 205, depending on the authentication mechanism and the lifetime of the key(s). For example, a temporary key used only for a single session may preferably be stored in the RAM section, while a permanent key may be stored in the ROM section. In a mechanism involving multiple keys, different keys may be stored in the same or in different sections.

Figure 3:
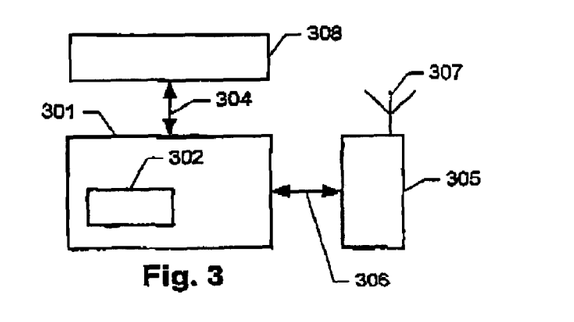
FIG. 3 shows a schematic view of a server communications terminal according to an embodiment of the invention.

FIG. 3 shows a schematic view of a modular server communications terminal according to an embodiment of the invention. The server communications terminal comprises a base module 301 with a subscription module 302 according to the invention. The base module 301 provides interfaces 304 and 306 to a user interface module 308 and a radio interface module 305. The user interface may provide a display for providing a graphical user interface and/or a keypad, a pointing device, or the like. The radio interface unit may comprise a radio transmitter/receiver and an aerial for connecting to a cellular network, a short-range radio transceiver and/or other wireless interfaces. The interfaces 304 and 306 may be implemented as plug-in interfaces, e.g. using a standard such as USB or the like. Alternative, the interfaces may be contact-free interfaces e.g. based on electromagnetic radiation, such as infrared or a radio link, e.g. using the Bluetooth technology or other short-range wireless communications technologies. The data communication via the interface 304 and/or the interface 306 may use a proprietary or a standard protocol. For example the base module may be implemented as a smart card, e.g. a smart card having an integrated radio interface. In another embodiment, the base module may be implemented as a unit providing the interfaces 304 and 306 and including a subscription module, e.g. as a removably insertable unit, such as a smart card. In a modular architecture as in the example of FIG. 3, an end-to-end authentication and protection of the communication to/from the subscription module is of particular importance, as the interfaces 304 and/or 306 of the base module are open and, thus, vulnerable for unauthorised access. Therefore, it is an advantage of the invention that it secures all interfaces when providing remote access to a subscription module.

Figure 4:
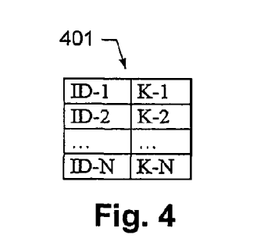
FIG. 4 shows a schematic view of a key table stored in a subscription module according to an embodiment of the invention.

FIG. 4 shows a schematic view of a key table stored in a subscription module according to an embodiment of the invention. According to one embodiment of the invention, the authentication of the client communications terminal is based on a symmetric authentication procedure based on a shared secret. Hence, the RAA Client and the subscription module need to have a shared secret in order to authenticate each other and to protect the communication. This shared secret may be a long-lived secret key stored in the subscription module and the client communications terminal, respectively. Alternatively, the shared secret may be a secret key which is created when needed and which is valid for a specific time period, for one session, or the like, i.e. it is a temporary shared secret.

If the shared secret is long-lived it may, for example, be entered into the RAA client by the RAA client user or by an operator. In the embodiment of FIG. 2, the entered shared secret may be stored in EPROM section 204 of the memory of the subscription module. The operator may also send the secret key over the air or by any other means to the RAA client using some dedicated protocol. Preferably, this protocol needs some additional security mechanism to protect the shared secret when transferred over the air. An example of such mechanism is encryption of the channel with an encryption key derived from another shared secret stored in the RAA client. This key can for example be stored in the RAA client at the time of manufacture. Alternatively, the operator may pre-configure the subscription module with a long-lived shared secret during the personalisation of the subscription module. In the embodiment of FIG. 2, Such a pre-configured shared secret may for example be stored in the ROM section 205 of the memory of the subscription module.

Referring to FIG. 4, a subscription module or a RAA Client might have several different shared secrets. One particular shared secret is used to secure the communication with one particular RAA Client or subscription module respectively. In order to identify the shared secret, each shared secret is labelled with a unique identifier. This identifier can be of any kind, but should be unique. If each subscription module has a unique ID, it is possible for all RAA Clients to distinguish between different subscription modules and to know which shared secret to use for a connection to a particular subscription module. For example, if the subscription module is implemented as a SIM card, the International Mobile Subscriber Identity (IMSI) may be used to identify the subscription module. Similarly, if each RAA Client has a unique ID, it is possible for all subscription modules to distinguish between different RAA Clients and to know which shared secret to use for a connection to particular RAA Client. Hence, in the subscription module, a table 401 may be stored comprising a number of secret key codes K-1 through K-N together with their corresponding identifiers ID-1 through ID-N, respectively. In the embodiment of FIG. 2, the table 401 may be stored in the EPROM memory section 204, thereby allowing a user to add, edit, or delete entries in the table, e.g. in order to add a new authorised client terminal, or in order to delete an old one. For example, the keys may be 128 bit symmetric keys.

Figure 5:
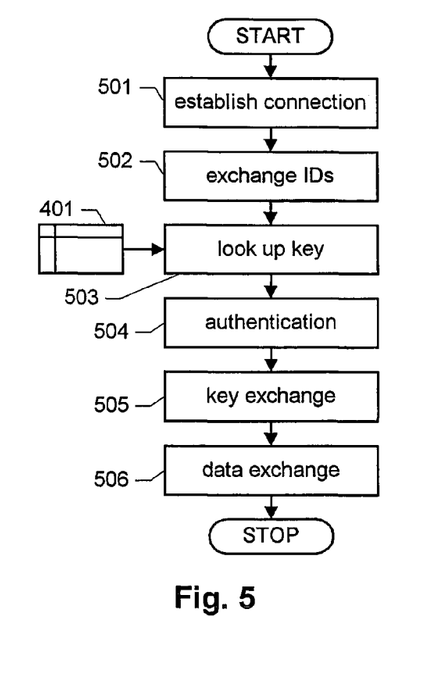
FIG. 5 shows a flow diagram of an authentication procedure according to an embodiment of the invention based on a symmetric key.

FIG. 5 shows a flow diagram of an authentication procedure according to an embodiment of the invention based on a symmetric key. Initially, in step 501, a connection is established between the RAA Client and the subscription module. Preferably, this communications link is a short-range wireless communications link as illustrated by the wireless link 115 in FIG. 1. If the wireless connection uses the Bluetooth technology, the connection may be established automatically when the server communications terminal and the client communications terminal are brought within each others range of radio coverage, e.g. within a range of a few meters. In a scenario where the server communications terminal is a mobile telephone and the client communications terminal is a car phone, the connection may be established when the user approaches/enters the car. During or after the connection establishment, in step 502, the terminal exchange IDs. In the subsequent step 503, the IDs are used to look up the corresponding shared secret in a table 401 stored in the memory of the subscription module and in a corresponding table in the memory of the client communications terminal. In step 504, the shared secret is used for authenticating the client communications terminal by the subscription module and to authenticate the subscription module by the client communications device. In step 505, a new shared secret is generated and exchanged between the subscription module and the client communications terminal. Preferably, this key exchange may be a part of the authentication procedure. Alternatively, the key exchange is performed after successful authentication. The authentication and key exchange can be done in several different ways using well known state of the art solutions for shared secret based authentication and key exchange, such as PIN or password based solutions, challenge/response based solutions, a Feige-Fiat-Shamir protocol, a Schnorr protocol, etc., and Diffie-Hellman and related protocols, key exchange using public key encryption, Kerberos type protocols, etc., respectively. The authentication and key exchange may be implemented in hardware or in software. In one embodiment, the authentication further requires an approval by the user of the server communications terminal, thereby further increasing the security against misuse or accidental use. For example, the user may be required to enter a PIN code indicative of an authorisation for remotely accessing the subscription module of the server communications terminal.

After successful authentication and key exchange, the actual data exchange between the client communications terminal and the subscription module may be initiated in step 506. The data exchange may comprise the transmission of data to and/or from the subscription module, e.g. PIN codes, authorisation codes, identifiers, account numbers, or the like.

Preferably, in order to protect the communication between the RAA Client and the subscription module, all messages sent between the entities are encrypted with a symmetric encryption algorithm. Messages encrypted in the PRA Client are decrypted in the subscription module. Messages encrypted in the subscription module are decrypted in the RAA client. The algorithm used to encrypt the messages may be implemented in hardware or software in the RAA client and subscription module respectively. Any standard algorithm and procedure can be used, such as the Data Encryption standard (DES), triple DES (3DES), SAFER+, Advanced Encryption Standard (AES), RC4, RC5, etc. In order to encrypt the messages the RAA client and subscription module use the new shared secret exchanged in step 505. Alternatively, a key derived from the exchanged shared secret may be used. In another embodiment, the shared secret used for authentication may also be used for encryption without further key exchange. However, the generation of an encryption key provides a higher level of security.

Furthermore, in order to further protect the communication between the RAA Client and the subscription module, all messages sent between the entities are integrity protected. The messages are protected with a symmetric authentication algorithm. A cryptographic message tag is calculated for each message in the RAA Client and checked in the subscription module. A cryptographic message tag is calculated for each message in the subscription module and checked in the RAA Client. The same procedure may be applied in the reverse direction. The algorithm used to calculate the message tag can be implemented in hardware or software in the RAA client and subscription module, respectively. Any standard algorithm and procedure may be used. The shared symmetric key used in the integrity protection may be the shared secret exchanged in step 505, or a key derived from that shared secret.

Alternatively to a long-lived shared secret, e.g. if no long-lived shared secret exists between the RAA Client and the subscription module, the RAA Server user may allow a particular RAA Client to temporarily connect to the subscription module in the RAA Server. Then a temporary shared secret between the subscription module and the RAA Client needs to be generated. This may be done in several different ways, for example:

- The RAA Server user enters a shared secret value into the RAA Server. The shared secret is directly transferred to the subscription module. Then the RAA Client user enters the same secret value into the RAA Client. As a user interaction is required, a high level of security is achieved.
- The subscription module generates a secret random value. This value is displayed on the RAA server. The RAA Client user enters the secret random value into the RAA Client. As a user interaction is required, a high level of security is achieved.
- The subscription module sends a secret value directly to the RAA Client. The secret value may be protected using for example encryption. The key used to protect the secret value can be a common key known to a particular set of RAA Clients and subscription modules.

Figure 6:
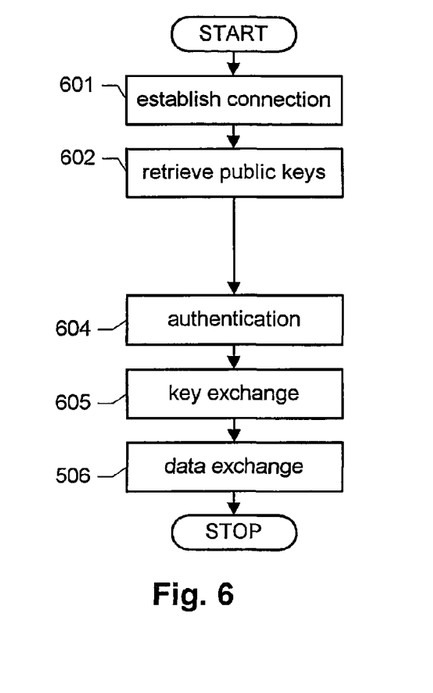
FIG. 6 shows a flow diagram of an authentication procedure according to an embodiment of the invention based on a public key.

FIG. 6 shows a flow diagram of an authentication procedure according to an embodiment of the invention based on a public key mechanism. In the initial step 601 a connection between the client communications terminal and the server communications terminal is established as described in connection with step 501 of FIG. 5. In step 602, the public key of the RAA Client is retrieved by the subscription module. In order for the subscription module to authenticate and exchange a key with the RAA Client, the subscription module needs access to one or several trusted public keys that this RAA Client uses. The subscription module can obtain the public key(s) in several different ways providing different levels of security. Examples of mechanisms to obtain the public key(s) include:

The subscription module is pre-configured with a set of trusted public keys used by the RAA Clients. Hence, in step 602, the subscription module may retrieve the public key(s) from its memory, e.g. a ROM or EPROM section of a SIM card as described in connection with FIG. 2.

The public key(s) of the RAA Client are transmitted to the subscription module during the connection establishment between the subscription module and the RAA client. The subscription module trusts the public keys automatically or upon receipt of a user input approving the public keys. Hence, in this example, step 602 is performed as a part of the connection establishment in step 601.

The subscription module requests the RAA Client to transfer the public key(s) of the RAA Client during the connection establishment between the subscription module and RAA Client. The key(s) are transferred to the subscription module, possibly together with a public key of a trusted third party. The public key(s) of the subscription module are signed with the private key of the trusted third party.

The subscription module asks the RAA Client for the public key(s) of the Client at the connection establishment between the subscription module and RAA Client. The key(s) are transferred to the subscription module in a digital certificate. An example of a digital certificate format is the X.509 certificate format.

The RAA Server user enters at least one or several hash value of a public keys or digital certificate into the device. The hash value is directly transferred to the subscription module. Later, the subscription module receives one or several digital certificates from the RAA Client. The subscription module hashes the received public key or certificate. If the computed hash value corresponds to the hash value entered by the RAA server user, the subscription module trusts the public key. This procedure can, of course, be applied on multiple keys or certificates each having their associated hash value.

Similarly, in order for the RAA Client to authenticate and exchange a key with the subscription module using a public key mechanism, the RAA Client needs access to one or several trusted public keys belonging to the subscription module. Hence, in an embodiment where the RAA client authenticates the subscription module, step 602 further includes the step of retrieving the public key(s) of the subscription module by the RAA Client. As described above, this may be done in several different ways, for example:

The RAA Client is pre-configured with a set of trusted public key(s) belonging to the subscription module. Hence, in step 602, the RAA Client retrieves the public key(s) from its memory, e.g. a ROM or EPROM, the memory of a SIM card included in a mobile phone, a WIM card comprising public keys and certificates, or the like.

The RAA Client asks the subscription module for the public key(s) of the module at the connection establishment between the RAA Client and subscription module. The RAA Client trusts the public key(s) automatically or upon receipt of a user input approving the public keys. Hence, in this example, step 602 is performed as a part of the connection establishment in step 601.

The RAA Client asks the subscription module for the public key(s) of the module at the connection establishment between the RAA Client and the subscription module. The key(s) are transferred to the RAA client, possibly together with a public key of a trusted third party. The public key(s) of the subscription module are signed with the private key of the trusted third party.

The RAA Client asks the subscription module for the public key(s) of the module at the connection establishment between the RAA Client and subscription module. The key(s) are transferred to the RAA client in a digital certificate. An example of a digital certificate format is the X.509 certificate format.

The RAA Client user enters one or several hash values of public keys or digital certificates into the device. Later, the RAA Client receives one or several digital certificates from the subscription module. The RAA Client hashes the received public key(s) or certificate(s). If the has value(s) correspond to the hash value entered by the RAA Client user, the public key(s) are trusted by the RAA Client.

In step 604, the trusted public key(s) related to the RAA Client are used for the subscription module to authenticate the RAA Client. Similarly, the trusted public key(s) stemming from the subscription module are used to authenticate the subscription module. In step 605, a shared secret is generated and exchanged between the subscription module and the client communications terminal, resulting in a common secret key for the client communications device and the subscription module. Preferably, this key exchange may be a part of the authentication procedure. Alternatively, the key exchange is performed after successful authentication. The authentication and key exchange can be done in several different ways using well known state of the art solutions for public key based authentication and key exchange, such as PIN or password based solutions, challenge/response based solutions, a Feige-Fiat-Shamir protocol, a Schnorr protocol, etc., and Diffie-Hellman and related protocols, key exchange using public key encryption, Kerberos type protocols, etc., respectively. The authentication and key exchange may be implemented in hardware or in software. In one embodiment, the authentication further requires an approval by the user of the server communications terminal, thereby further increasing the security against misuse or accidental use. For example, the user may be required to enter a PIN code indicative of an authorisation for remotely accessing the subscription module of the server communications terminal.

After successful authentication and key exchange, the actual data exchange between the client communications terminal and the subscription module may be initiated in step 506, preferably using a symmetric encryption algorithm, as described in connection with FIG. 5. In order to encrypt the messages, the RAA client and subscription module use the shared secret exchanged in step 605. Alternatively, a key derived from the exchanged shared secret may be used. In another embodiment, the encryption may be based on a public key mechanism, thereby not requiring the exchange of a shared secret.

Furthermore, in order to further protect the communication between the RAA Client and the subscription module, all messages sent between the entities are integrity protected, as described in connection with FIG. 5. The shared symmetric key used in the integrity protection may be the shared secret exchanged in step 605, or a key derived from that shared secret.

It is noted that the invention has mainly been described in connection with a GSM network. However, it is understood that the present invention is not limited to GSM networks but may also be applied to other communications networks, e.g. other mobile telecommunications networks such as GRPS and 3$^{rd}$ generation networks, such as UMTS.

The invention claimed is:

1. A method of granting a client communications terminal access to a subscription module of a server communications terminal, the method comprising the steps of:
    establishing a communication link between the client communications terminal and the server communications terminal wherein the server communications terminal includes the subscription module having an authenticating functionality;
    authenticating the client communications terminal by the subscription module using a key-based authentication procedure based on a first secret key stored in both the client communications terminal and the subscription module;
    generating a second secret key;
    exchanging the second secret key between the client communications terminal and the subscription module;
    encrypting data related to the subscription module using an encryption key derived from the second secret key; and
    communicating the encrypted data between the server communications terminal and the client communications terminal via the communications link.

2. The method according to claim 1, further comprises the step of authenticating the subscription module by the client communications terminal using the key-based authentication procedure.

3. The method according to claim 1, wherein the key-based authentication procedure is a symmetric authentication procedure based on the first secret key.

4. The method according to claim 3, further comprises the step of deriving an encryption key from the first secret key.

5. The method according to claim 4, wherein the step of communicating data related to the subscription module further comprises the step of encrypting the data using the encryption key derived from the first secret key.

6. The method according to claim 3, wherein the step of communicating data related to the subscription module further comprises the step of integrity protecting the data using a key derived from the first secret key.

7. The method according to claim 1, wherein the key-based authentication procedure is a public key-based authentication procedure wherein the subscription module has access to a public key related to the client communications terminal.

8. The method according to claim 7, wherein the method further comprises the step of authenticating the subscription module by the client communications terminal using the public key-based authentication procedure wherein the client communications terminal has access to a public key related to the subscription module.

9. The method according to claim 7, wherein the step of communicating data related to the subscription module further comprises the step of integrity protecting the data using the key derived from the second secret key.

10. The method according to claim 1, wherein the step of authenticating the client communications terminal further comprises the step of inquiring an input from a user of the server communications terminal indicative of an approval of the authentication.

11. The method according to claim 1, wherein the step of initiating communicating data related to the subscription module further comprises the step of performing a user authorization based on a PIN code stored on the subscription module.

12. An arrangement for granting access to a subscription module in a communications system, the arrangement comprising:
    a client communications terminal; and
    a server communications terminal, said server communications terminal including the subscription module, the client and server communications terminals each comprising respective communications means for establishing a communications link between the client communications terminal and the server communications terminal, and for communicating data related to the subscription module between the server communications terminal and the client communications terminal via the communications link wherein the subscription module further comprises processing means for:
        authenticating the client communications terminal using a key-based authentication procedure based on a first secret key stored in both the client communications terminal and the subscription module,
        generating a second secret key,
        exchanging the second secret with the client communications terminal,
        encrypting data related to the subscription module using an encryption key derived from the second secret key, and
        communicating the encrypted data between the server communications terminal and the client communications terminal via the communications link.

13. The arrangement according to claim 12, wherein the communications link is a wireless communications link.

14. The arrangement according to claim 12, wherein the server communications terminal, the communications means of the server communications terminal, and the subscription module are physically included in a single unit.

15. The arrangement according to claim 12, wherein at least one of the server communications terminal and the client communications terminal is a mobile telephone.

16. The arrangement according to claim 12 wherein the respective communications means are Bluetooth transceivers.

17. A server communications terminal comprising:
    a subscription module; and
    communications means for establishing a communications link with a client communications terminal and for communicating data related to the subscription module via the communications link wherein the subscription module further comprises processing means for:
        authenticating the client communications terminal using a key-based authentication procedure based on a first secret key stored in both the client communications terminal and the subscription module,
        generating a second secret key,
        exchanging the second secret with the client communications terminal,
        encrypting data related to the subscription module using an encryption key derived from the second secret key, and
        communicating the encrypted data between the server communications terminal and the client communications terminal via the communications link.

18. A client communications terminal comprising:
    communications means for establishing a communications link with a server communications terminal, said server communications terminal including a subscription module having an authorization functionality, and for communicating data related to the subscription module via the communications link; and processing means for performing a key-based authentication procedure cooperatively with the subscription module allowing the subscription module to:
authenticate the client communications terminal based on a first secret key stored in both the client communications terminal and the subscription module,
generate a second secret key,
exchange the second secret key between the client communications terminal and the subscription module,
encrypt data related to the subscription module using an encryption key derived from the second secret key, and
communicate the encrypted data between the server communications terminal and the client communications terminal via the communications link.

19. A subscription module for use with a portable radio communications terminal, the portable radio communications terminal including communications means for establishing a communications link with a client communications terminal and for communicating data related to the subscription module via the communications link wherein the subscription module comprises processing means to, when the subscription module is in connection with the portable radio communications terminal;
authenticate the client communications terminal using a key-based authentication procedure based on a first secret key stored in both the client communications terminal and the subscription module,
generate a second secret key,
exchange the second secret with the client communications terminal,
encrypt data related to the subscription module using an encryption key derived from the second secret key, and
communicate the encrypted data between the server communications terminal and the client communications terminal via the communications link, wherein the subscription module is contained within the server communications terminal.

20. The subscription module according to claim 19, wherein the subscription module is a smart card.

21. The subscription module according to claim 20, wherein the smart card comprises an integrated radio transceiver.

22. The subscription module according to claim 19, wherein the subscription module is a security module comprising a removably insertable smart card.

23. The subscription module according to claim 19, wherein the subscription module is removably insertable into the portable radio communications terminal.

24. The method according to claim 1, wherein the server communications terminal is a portable radio communications terminal.

25. The method according to claim 24, wherein the subscription module is removably insertable into the portable radio communications terminal.

26. The method according to claim 1, wherein the subscription module is removably insertable into the server communications terminal.

27. The arrangement according to claim 12, wherein the server communications terminal is a portable radio communications terminal.

28. The arrangement according to claim 27, wherein the subscription module is removably insertable into the portable radio communications terminal.

29. The arrangement according to claim 12, wherein the subscription module is removably insertable into the server communications terminal.

30. The server communications terminal according to claim 17, wherein the server communications terminal is a portable radio communications terminal.

31. The server communications terminal according to claim 30, wherein the subscription module is removably insertable into the portable radio communications terminal.

32. The server communications terminal according to claim 17, wherein the subscription module is removably insertable into the server communications terminal.

33. The client communications terminal according to claim 18, wherein the server communications terminal is a portable radio communications terminal.

34. The client communications terminal according to claim 33, wherein the subscription module is removably insertable into the portable radio communications terminal.

35. The client communications terminal according to claim 18, wherein the subscription module is removably insertable into the server communications terminal.

36. The method of claim 1, wherein the client communications terminal requests registration of the client communications terminal in a cellular network utilizing the communicated data.

* * * * *

UNITED STATES PATENT AND TRADEMARK OFFICE
CERTIFICATE OF CORRECTION

PATENT NO. : 8,295,808 B2
APPLICATION NO. : 10/476522
DATED : October 23, 2012
INVENTOR(S) : Christian Gehrmann and Bernard Smeets It is certified that error appears in the above-identified patent and that said Letters Patent is hereby corrected as shown below:

In column 14, line 21, please change "has" to --hash--;

In column 14, line 53, please change "506" to --606--;

In column 15, line 67 (in claim 11), please delete "initiating";

In column 16, line 24 (in claim 12), please change "secret" to --secret key--;

In column 16, line 56 (in claim 17), please change "secret" to --secret key--;

In column 17, line 28 (in claim 19), please change ";" to --,--;

In column 17, line 34 (in claim 19), please change "secret" to --secret key--;

Signed and Sealed this
Twenty-sixth Day of March, 2013

Teresa Stanek Rea
*Acting Director of the United States Patent and Trademark Office*